US009361602B1

(12) United States Patent
Hodges et al.

(10) Patent No.: US 9,361,602 B1
(45) Date of Patent: Jun. 7, 2016

(54) TEMPORARY ELECTRONIC MAIL ADDRESSES

(75) Inventors: D. Skye Hodges, Salt Lake City, UT (US); Eugene Kenneth Davis, Lindon, UT (US)

(73) Assignee: Novell, Inc., Provo, UT (US)

( * ) Notice: Subject to any disclaimer, the term of this patent is extended or adjusted under 35 U.S.C. 154(b) by 1647 days.

(21) Appl. No.: 10/685,158

(22) Filed: Oct. 14, 2003

(51) Int. Cl.
*G06Q 10/00* (2012.01)
*G06Q 10/10* (2012.01)
*H04L 12/58* (2006.01)

(52) U.S. Cl.
CPC ............. *G06Q 10/10* (2013.01); *G06Q 10/107* (2013.01); *H04L 51/22* (2013.01)

(58) Field of Classification Search
CPC . H04M 3/42008; H04M 3/382; H04M 3/527; H04M 3/51
USPC .......................................................... 709/206
See application file for complete search history.

(56) References Cited

U.S. PATENT DOCUMENTS

| | | | | |
|---|---|---|---|---|
| 5,822,526 A * | 10/1998 | Waskiewicz | ............ | H04L 51/28 709/206 |
| 6,138,146 A | 10/2000 | Moon et al. | ................... | 709/206 |
| 6,157,829 A * | 12/2000 | Grube et al. | ................ | 455/414.1 |
| 6,381,634 B1 | 4/2002 | Tello et al. | ..................... | 709/206 |
| 6,393,465 B2 * | 5/2002 | Leeds | ..................... | H04L 51/12 709/206 |
| 6,427,164 B1 | 7/2002 | Reilly | ............................ | 709/206 |
| 6,442,591 B1 | 8/2002 | Haynes et al. | ................ | 709/206 |
| 6,487,584 B1 * | 11/2002 | Bunney | ................... | H04L 29/06 709/206 |
| 6,654,787 B1 * | 11/2003 | Aronson | ............... | H04L 12/585 707/999.003 |
| 6,708,205 B2 * | 3/2004 | Sheldon et al. | ................ | 709/206 |
| 6,973,481 B2 * | 12/2005 | MacIntosh et al. | ........... | 709/206 |
| 2002/0016735 A1 * | 2/2002 | Runge | ................... | G06Q 10/107 705/14.49 |
| 2002/0029248 A1 * | 3/2002 | Cook | .................... | G06Q 10/107 709/206 |
| 2002/0138581 A1 * | 9/2002 | MacIntosh | ........... | G06Q 10/107 709/206 |
| 2002/0169840 A1 * | 11/2002 | Sheldon et al. | ............... | 709/206 |
| 2003/0233415 A1 * | 12/2003 | Beyda | .................. | G06Q 10/107 709/206 |
| 2004/0024823 A1 * | 2/2004 | Del Monte | ........... | G06Q 10/107 709/206 |
| 2004/0148358 A1 * | 7/2004 | Singh | ................... | G06Q 10/107 709/207 |
| 2004/0153512 A1 * | 8/2004 | Friend | .................... | G06Q 30/02 709/206 |
| 2004/0201625 A1 * | 10/2004 | Karamchedu | ........ | G06Q 10/107 715/752 |
| 2005/0114484 A1 * | 5/2005 | Wilson | .................. | G06Q 10/10 709/223 |

FOREIGN PATENT DOCUMENTS

EP    1223527 A2  *  7/2002
GB    2398399 A   *  8/2004

* cited by examiner

*Primary Examiner* — William Goodchild
(74) *Attorney, Agent, or Firm* — Schwegman Lundberg & Woessner, P.A.

(57) ABSTRACT

Techniques are provided for generating and managing temporary email addresses. A requestor having a requestor email address makes a request to receive a temporary email address. The temporary email address is generated and mapped to the requestor email address. Messages received that are associated with the temporary email address are mapped to the requestor email address and forwarded to the requestor. The temporary email address expires when an expiring event is detected.

11 Claims, 2 Drawing Sheets

TEMPORARY ELECTRONIC MAIL ADDRESSES

FIELD OF THE INVENTION

The invention relates generally to electronic mail (email), and more specifically to techniques for generating and managing temporary email addresses.

BACKGROUND OF THE INVENTION

Society in general and business in particular have become increasingly dependent upon electronic communications. Most electronic communications involve or require the use of electronic mail (email) addresses. In fact, many transactions occurring over the Internet require a user to provide his/her email address in order to successfully complete those transactions.

As a result, over time users have increasingly provided their email addresses to a myriad of enterprises, and these email addresses have been subsequently used for purposes that the users never anticipated, never desired, and never expected. For example, a user's email address can be sold from one enterprise to another enterprise and then used for purposes of finding private or confidential information (e.g., address, phone number, name, etc.) about the user. An email address can also be used to harass a user with unwanted solicitations sent via email spam. Additionally, an email address can be used for maliciously propagating computer viruses to a user's computer.

A user is generally not in a position to deny an enterprise his/her email address. This is particularly true when a user needs to transact with the enterprise and that enterprise requires a valid email address for the transaction. Because of circumstances such as this, users will often go to a free email service, such as Yahoo or Hotmail and create an email account, which the user manually monitors, manages, and provides to the enterprise. This is not efficient, is time consuming, and creates further problems for the user and for the free email service. Some problems associated with a free email address from a user's perspective includes situations where a user forgets his/her free email address, forgets his/her password which is needed to access the free email account, or forgets to clean up accumulated messages from his/her email inbox, such that no additional email messages is accepted into the email account. From a service provider's perspective, a variety of management rules must be continually monitored, altered, and enforced against free email subscribers (users) so that the service can continue to operate effectively. This is so, because without extensive management the free email service would rapidly deteriorate because there is only a limited amount of storage, bandwidth, and processing capabilities that the service provides to a potentially limitless number of users. As a result, it is not uncommon for a service provider to limit the size of email messages that can be sent or received by an email account, to limit the number of messages that can be retained within an account's inbox, and to remove accounts where the associated users have not logged into the account after a defined period of elapsed time.

Additionally, many enterprises contractually assert that a user's email address will not be disclosed, sold, or provided to other partners. These contractual terms are often expressed in an enterprise's privacy policy or are affirmatively made via check box links from the enterprise's web sites with such phrases as "I do not wish my email address to be provided to any partners of the enterprise," and the like. However, users have no way of knowing when these contractual terms have been breached by the enterprise.

Once more, users usually have no way of proving or demonstrating that an enterprise has in fact violated its obligations by the unauthorized disclosure of an email address. This is so, because a user will generally only have one or at most a few email addresses and when that email address is provided by an enterprise to one of its partners that partner will not identify to the user how it was that the partner acquired the user's email address in any communications made with the user. Thus, the user may suspect a certain enterprise has violated a contractual obligation with the user, but the user has no way to demonstrate this breach.

In some cases, users become so frustrated that their privacy is being compromised and their email inbox has become nearly unusable since it is littered with spam and potential viruses, that the users will shut down one email account with an ISP entirely and open a new email account with another ISP and start anew. But, this is frustrating as well, because there are many friends, family members, and legitimate enterprises that communicate with the users via the old email address. In many cases, each of these entities must be manually notified about a user's changed email address and it will take sometime before things return to normal for the user.

Anyone that transacts and communicates via electronic email is familiar with the problems mentioned above and with many other problems that are associated with providing one's email address over a network, such as the Internet. Users have come up with their own techniques and workarounds to these problems, but each of these workarounds are not optimal, are unnecessarily cumbersome, and are time consuming.

Thus, improved techniques for managing an email address are needed.

SUMMARY OF THE INVENTION

In various embodiments of the invention, techniques are presented for generating and managing temporary electronic mail (email) addresses. A generated temporary email address is mapped to an original email address. While the mapping remains active messages directed to the temporary email address are intercepted and forwarded to the original email address. Moreover, while the mapping remains active a requestor associated with the original email address can send messages to recipients using the temporary email address. These recipients see only messages having the temporary email address and are unaware of the original email address. When the mapping expires no messages directed to or from the temporary email address are processed or forwarded to or from the original email address.

More specifically, and in one embodiment of the invention, a method for generating a temporary email address is presented. Initially, a request is received for a temporary email address. The request is received from a requestor having a requestor email address. Next, the temporary email address is generated and mapped to the requestor email address. Finally, the temporary email address is transmitted to the requestor.

In another embodiment of the invention, another method for managing a temporary electronic mail (email) address is described. A temporary email address is requested for an original email address. The temporary email address is used as if it were the original email address. A message associated with the temporary email address is received.

In still another embodiment of the invention, a temporary email address system is taught. The temporary email address system includes a temporary email address generator, a temporary email address mapper, and a temporary email address interface. The temporary email address interface receives a request from a requesting email address to generate a temporary email address. The temporary email address interface interacts with the temporary email address generator for generating the temporary email address. Furthermore, the temporary email address interface interacts with the temporary email address mapper for establishing an association between the requesting email address and the temporary email address.

In yet another embodiment of the invention, a temporary email address, residing in a computer-accessible medium, is presented. The temporary email address includes a temporary identifier and a domain name. The temporary identifier maps to an original identifier, which is a first portion of the original email address. The domain identifier is the same for the temporary email address and the original email address. Alternatively, the domain identifier is mapped to a different domain based on available domains managed by an email service. The temporary identifier and the domain identifier combine to form the temporary email address. The temporary email address adapted to be processed with messages, where the messages that include the temporary email address are sent to the original email address by mapping the temporary identifier to the original identifier. Moreover, the temporary email address expires based on an expiring event.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the terms "service" and "application" are used. A service can include one or more applications and a single application can be viewed as a service. Thus, as used herein service and application are used interchangeably.

Moreover, "an email client" is an application which a user interacts with for receiving and sending emails. The email client interfaces with other email clients over a network, such as the Internet. A group of email clients can be networked together and managed by an email server service. The email client sends and receives electronic messages based on email addresses. An email address is an identifier that uniquely identifies an entity. An entity can be a group of users, a single user, or an automated application.

Email addresses are distributed by email service providers (email service), such as Internet Service Providers (ISPs) or domain hosting services (e.g., Yahoo, Hotmail, MSN mail, and others). Generally, an email address includes a unique identifier for an entity and a domain identifier. The unique identifier is unique within the domain identified by the domain identifier. An email address is routed between domains of a network to its defined domain (identified by the domain identifier), within the proper domain the email address is further routed to an entity or recipient that is uniquely identified by it entity identifier. For example, consider the email address myid@novell.com, the entity identifier is "myid" and the domain identifier is "novell.com." The entity identifier and the domain identifier are typically separated by a reserved character, such as "@."

In one embodiment of this invention, the techniques presented herein for generating and managing email addresses are integrated into a GroupWise email client/server product, distributed by Novell, Inc., of Provo, Utah. Of course other embodiments can use the teachings of this invention, such that any existing or newly developed email client/server product can implement the teachings presented herein and an ISP or domain hosting service can be augmented with interfaces to support the integration and management of the teachings presented herein. All such modifications and interfaces are intended to fall within the scope of this invention.

Figure 1:
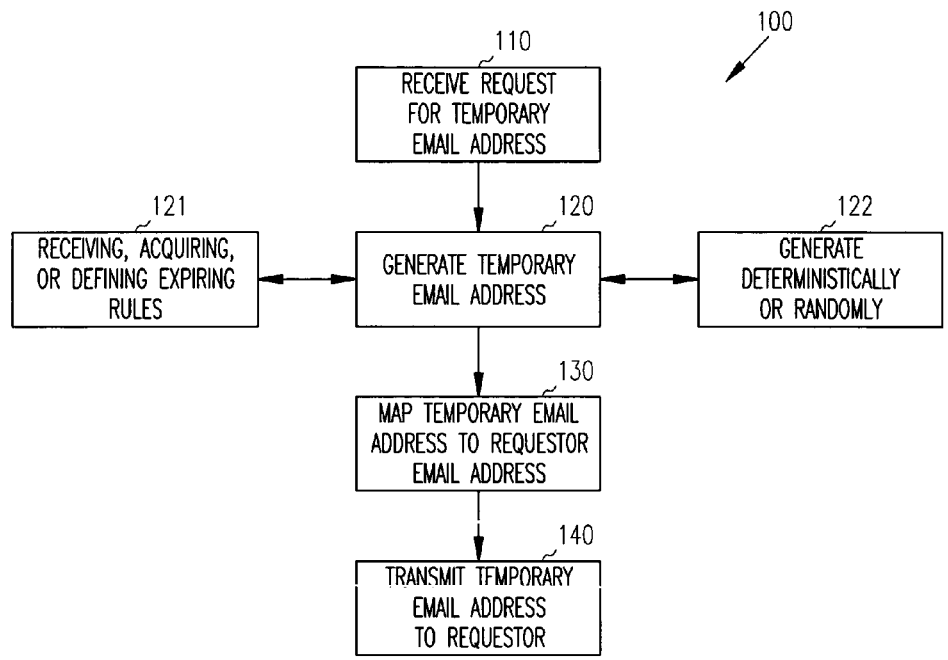
FIG. 1 is a flowchart representing a method for generating a temporary email address.

FIG. 1 is a flowchart representing one method 100 for generating a temporary email address. The method 100 is implemented as one or more applications or services residing in a computer-accessible medium. In one embodiment, the method 100 is implemented as a modified or new interface to an ISP or a domain hosting service, where the ISP and domain hosting service provides, resolves, routes, and manages email addresses on behalf of a recipient. The method 100 need not be in operation, but when the method 100 is operational it performs the following techniques for generating a temporary email address.

At 110, a request for a temporary email address is received from a requestor. The requestor makes the request using a requestor email address. Moreover, in some embodiments, the request is sent from an email client that the requestor uses to send and receive email messages. In other embodiments, the request is sent from a World-Wide Web (WWW) interface, such as a browser.

In some embodiments, the request includes additional information that the processing of the method 100 uses when generating the temporary email address. This additional information can include a specific value that the requestor desires the temporary email address to be, or can include rules which are used for determining the specific value for the temporary email address. For example, suppose that the requestor desires a temporary email address for downloading software from a WWW service, and that the requestor wants to readily identify all incoming email messages associated with that temporary email address. In this example, the requestor can make a request for a specific temporary email address by associating with the request a value to use for the temporary email request, such as mydownloads@mydomain.com. In this way, the request can be more complex and include a specific value for the temporary email address or include rules that are used to generate a specific value for the temporary email address.

At 120, after the request is received, a temporary email address is generated for the requestor email address. As was presented above and in some embodiments, at 121, the value or definition of that temporary email address can be included within the initial received request or can be defined by interacting with a requestor after the request is received. Alternatively, default rules can be used to define a value for the temporary email address.

Additionally, at 121, expiring rules can be used to define conditions that when detected will expire the temporary email address. Expiring rules can be based on a specified number of uses, occurrence of a specific date, elapsed periods of time, and the like. Moreover, in some embodiments, a specific value for the temporary email address is randomly generated at 122. Also, at 122, the specific value for the temporary email address can be deterministically generated.

At 130, once the temporary email address is generated it is mapped and linked with the requestor email address. The temporary email address is then transmitted at 140 to the requestor. The requestor is now free to use the temporary email address for purposes of communicating with other entities. For example, the requestor may wish to use the temporary email address to register for free service, to make a purchase from a service, or to acquire some good, service, or information from a desired service. The desired service requires a valid email address before the requestor is permitted to complete a transaction. The temporary email address can be used successfully by the requestor as that valid email address.

In this way, when a message is received that is to be forwarded to the temporary email address, the message is forwarded to the requestor email address. The requestor views the message within his/her email client as if the message was sent to the requestor email address. In some embodiments, the requestor's email client can also be modified to handle any messages associated with the temporary email address in a special manner. For example, the email client may automatically route the message to predefined folders, display the message's metadata (message subject, sender information, receiver information, and the like) with unique effects or characteristics (bold, italic, color, and others).

The temporary email address permits messages to be forwarded to the requestor email address. Further, the temporary email address expires when an expiring event or condition is detected. These expiring events are defined by default expiring rules or by rules defined by the requestor. Thus, events can be based on time or based on number of uses. For example, a temporary email address can have a one-time use, such that after an initial message is received and forwarded to the requestor email address, the temporary email address is no longer valid. Alternatively, the expiring rules can define N number of messages that may be forwarded to the requestor email address and when the N+1 message is received it is rejected as having an invalid email address because after the Nth message is forwarded, the temporary email address expires. In still other embodiments, the expiring rules are used to terminate or expunge the temporary email address after an elapsed period of time or on a defined calendar date.

Having the ability to administer and use temporary email addresses has a variety of other benefits for the requestor. For example, if the requestor uses a temporary email address with only one service and that service has a privacy policy which indicates that the email address will not be disclosed to any of its partners, then should the requestor receive messages directed to the temporary email address which are not from the service, the requestor has pretty good evidence that the service may have violated its own contractual agreement with the requestor. Additionally, because the temporary email address is temporary any email spam messages associated with the temporary email address will disappear when the temporary email address expires. Thus, the requestor is not forced to continually switch or change his/her requestor email address and is not forced to acquire additional email addresses from other domain services in order to avoid unwanted spam. Moreover, since spam is minimized and at some point eliminated when the temporary email address expires, the requestor's computing environment is safer since there is less exposure to spam and as a result less exposure to potential computer viruses which may be attached to the spam.

In addition, with some embodiments, the temporary email address is generated entirely randomly. This has some added protection for the requestor, because a randomly generated value for the temporary email address is less likely to be reproducible by a spammer. That is, many times a spammer will find a single valid email address within a domain and then proceed to programmatically generate combinations of identifiers within the domain using syntaxes and formats that were found in the valid email address. Thus, the random temporary email address can include random combinations of numbers, alphabetic characters, and punctuation. In this way, it is highly improbable that a spammer can recreate a valid temporary email address or the requestor email address.

It is to be noted, that the temporary email address is not only useful to the recipient in receiving messages, but is also useful to the recipient in sending messages. That is, the recipient can send messages or reply to messages using the temporary email address. The recipient of these temporary email address messages does not see the requestor's original email address, rather, the recipient sees messages associated with the temporary email address.

Figure 2:
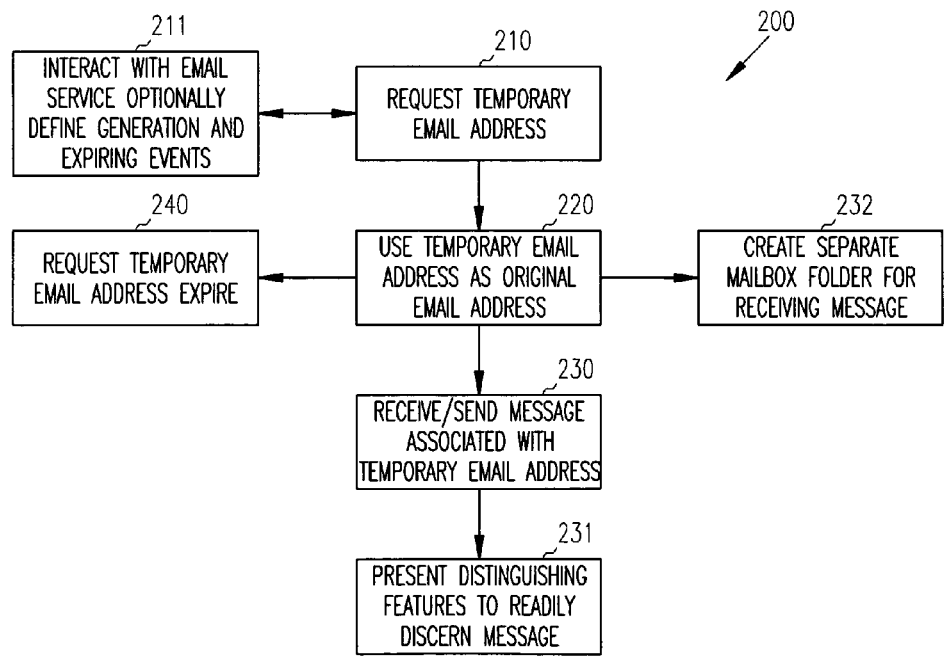
FIG. 2 is a flowchart representing a method for managing a temporary email address.

FIG. 2 is a flowchart representing one method 200 for managing a temporary email address. The method 200 is implemented in a computer-accessible or computer-readable medium. In one embodiment, the method is implemented within the interfaces of an email client and interacts with an email service provider (e.g., ISP, domain hosting service, or an email server).

Initially, a requestor having an email account with an email service interacts with his/her email client to make a request at 210 for a temporary email address. The temporary email address can be optionally defined by interacting with the email service. That is, at 211, the value assumed by the temporary email address can be defined as a string value supplied by the requestor, can be defined by rules supplied by the requestor, or can be selected from a predetermined list of available and inactive temporary email addresses. In other embodiments, the email service generates the value of the temporary email address randomly. Also, at 211, the requestor can interact with the email service for purposes of defining the conditions or events that will cause the temporary email address to expire. Expiring events can include a limited number of uses, elapsed period of time, or a specified calendar day.

Once the temporary email address is defined and generated for the requestor, then at 220, the requestor uses the temporary email address as if the temporary email address where his/her requestor email address. Thus, the temporary email address can be supplied to services via the Internet (or any network) for purposes of completing a transaction.

At some point during the limited lifespan of the temporary email address a message is received at 230, which is directed to the temporary email address. Alternatively, a message is generated by the requestor and sent using the temporary email address. A message that is received by the recipient is initially sent to the email service for processing, the email service uses the mapping between the temporary email address and the requestor email address to forward the message to the email client of the requestor. If the temporary email address has expired, then any message directed to that temporary email address is bounced back to the sender as an invalid email address. The email service maintains the expiring rules and determines when the temporary email address is no longer valid based on evaluation of the expiring rules. In some embodiments, at 240, the requestor can manually interact with the email service and issue an immediate command to expire the temporary email address.

When a message is received by the requestor's email client at 230, the metadata (e.g., time received, sender identification, receiver identification, subject, and the like) associated with that message is inspected. In some embodiments, the email client includes additional processing rules when it identifies a message as being sent to a requestor that is identified by the temporary email address. For example, the email client can be configured to automatically route any such message to a requestor-defined mail folder at 232. Additionally, any such received message can be presented with distinguishing features, at 231, which readily permit the requestor to identify the message as being associated with the temporary email address. Some distinguishing features can include bold text, defined colors, italic text, and the like. The distinguishing features can be applied to the metadata and presented within the email client's inbox for the requestor.

The interfaces and features of the method 200 can be integrated into any existing or conventional email client or custom-developed email client. That email client can be WWW enabled or a standalone client. The features of method 200 permit interaction with an email service for purposes of receiving and managing a temporary email address. The temporary email address expires based on the occurrence of a configured event or condition. Messages forwarded by the email service to the email client, which are directed to the temporary email address, can be uniquely processed and presented within the email client. Additionally messages sent from the email client using the temporary email address are forwarded to recipients as the temporary email address. Therefore, users can monitor how temporary email addresses are being used by those entities that received the temporary email addresses. Abusive uses can be reported. Additionally, users can limit and turn off spam by forcing the temporary email address to expire.

Figure 3:
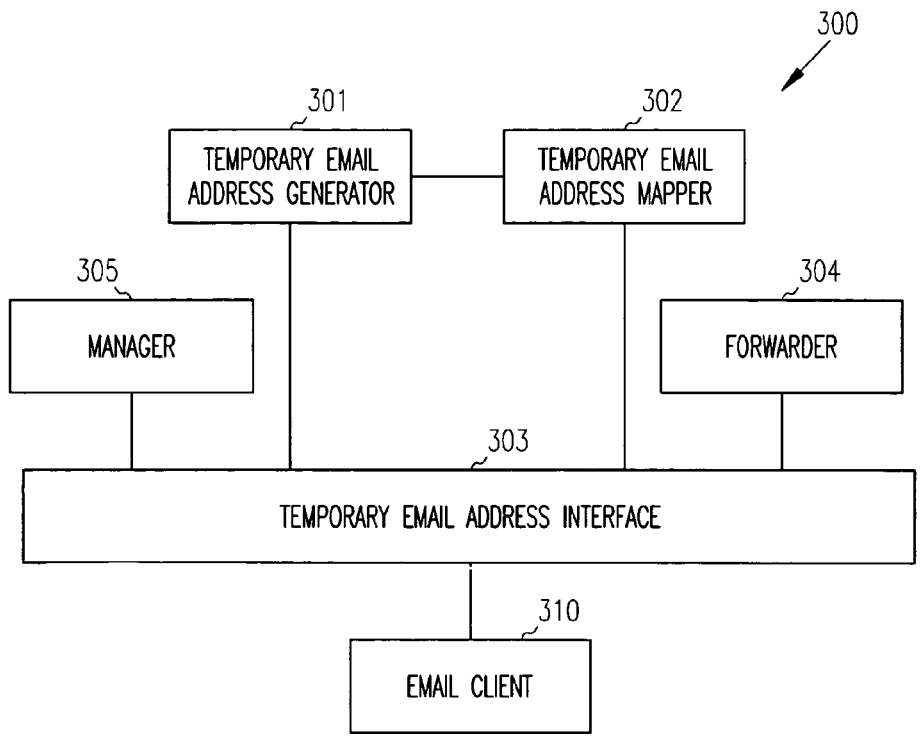
FIG. 3 is a diagram of a temporary email address system.

FIG. 3 is a diagram of one temporary email address system 300. The temporary email address system 300 is implemented in a computer-accessible or computer-readable medium. In one embodiment, the temporary email address system 300 is integrated as interfaces or features of an email service. The email service is an ISP, domain hosting service, or an email server that manages and distributes email addresses for a domain (email provider).

The temporary email address system 300 includes a temporary email address generator 301, a temporary email address mapper 302, and a temporary email address interface 303. The temporary email address interface 303 also interacts with a message forwarder 304 and a temporary email address manager 305. Additionally, the temporary email address interface 303 communicates with an email client 310. The email client 310 can be a standalone client or an email client 310 embedded within a browser (e.g., WWW enabled).

The temporary email address interface 303 receives requests from the email client 310 for generating a temporary email address. The request originates from a requestor who is interacting with the email client 310. The requestor is also associated with a unique requestor email address.

Upon receipt of the request, the temporary email address interface 303 interacts with the temporary email address generator 301 for purposes of generating a specific value for a temporary email address that is to be mapped to the requestor email address by the temporary email address mapper 302.

In some embodiments, the temporary email address interface 303 passes the request to the temporary email address generator 301, and the temporary email address generator 301 randomly generates a temporary email address. In other embodiments, the temporary email address generator 301 uses default deterministic rules for generating the temporary email address. In still other embodiments, the temporary email address generator 301 provides a list of temporary email addresses back to the temporary email address interface 303, where the temporary email address interface 303 provides the list back to the email client 310 where the requestor manually selects a specific temporary email address. In yet more embodiments, the temporary email address interface 303 communicates with the requestor accessing the email client 310 for purposes of receiving a specific temporary email address value or for purposes of receiving rules that define how the temporary email address generator 301 will produce a specific temporary email address value.

Once a temporary email address is generated, the requestor email address and the temporary email address are passed to the temporary email address mapper 302. The temporary email address mapper 302 maintains an active association and link between the temporary email address and the recipient email address.

In one embodiment, a forwarder 304 is used for forwarding messages sent to the temporary email address to the recipient email address. This is done by accessing the temporary email address mapper 302 when a message is received that is directed to the temporary email address and acquiring the recipient email address. The forwarder 304 also interacts with the temporary email address interface 303 to forward any such message to the email client 310. In a like manner, the forwarder 304 is also used to forward messages sent from the email client 310 to a recipient, where those messages are sent from the email client 310 using the temporary email address.

In another embodiment, a manager 305 monitors conditions and events defined by expiring rules or being manually received from the email client 310 via the temporary email address interface 303. If a condition or event indicates that a temporary email address is to expire then this is communicated to the temporary email address interface 303, or alternatively directly communicated to the temporary email address mapper 302. The email mapper 302 removes the active mapping or association between the requestor email address and the temporary email address. Thus, when this mapping is removed, the forwarder 304 will bounce messages directed to the temporary email address back to the original sender as being undeliverable and associated with an invalid email address.

The temporary email address system 300 interacts with by an email client 310 for purposes of generating and managing temporary emails associated with a requestor and his/her requestor email address. The temporary email address system 300 also forwards and processes messages that are directed to the temporary email addresses to the recipient email address within the email client 310. The requestor can interact with features of the email client 310 or the temporary email address interface 303 for purposes of initially generating the temporary email addresses and for purposes of defining the circumstances under which the temporary email addresses are to become invalid or expired.

Figure 4:
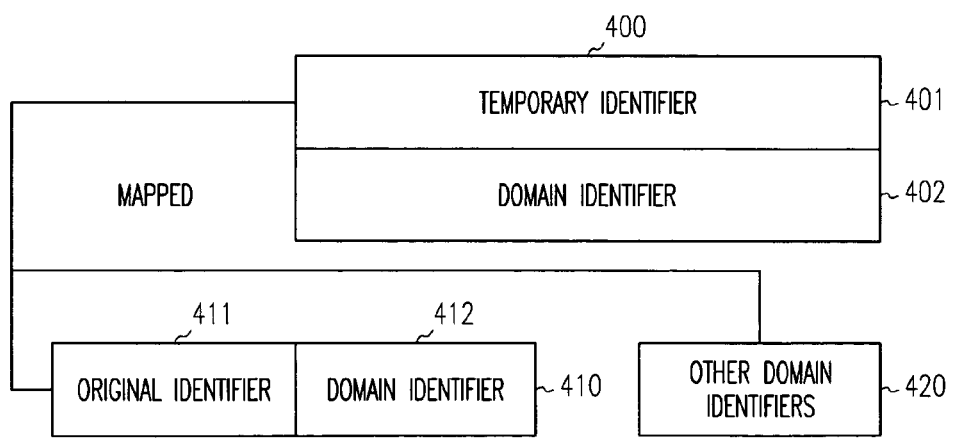
FIG. 4 is a diagram representing a temporary email address data structure.

FIG. 4 is a diagram representing one temporary email address data structure 400. The temporary email address data structure 400 is implemented and resides in a computer-accessible or computer-readable medium. The temporary email address data structure 400 is generated by an email service (email provider) and managed by the email service or an email client.

The temporary email address data structure 400 includes a temporary identifier 401 and a domain identifier 402. Specific values for the temporary identifier 401 are randomly or deterministically generated. That is, the temporary identifier values are random string values, string values that are produced by deterministic rules or string values that are manually supplied by a requestor interacting with an email client and an email service that consumes the temporary email address data structure 400.

The domain identifier 402 includes values that are the same as the requestor email address 410. The requestor email address 410 includes an original identifier 411 and a domain identifier 412. The values of the domain identifier 412 for the requestor email address 410 are the same values of the domain identifier 402 of the temporary email address data structure 400.

In other embodiments, the domain identifier 402 is mapped to another domain 420 that is managed by an email service that is generating and managing the temporary email address data structure. This is particularly useful when the email service includes a variety of domains, such as ".com," ".org," ".net," and others. In this way, the domain identifier 402 can be mapped to domains other than that which is defined in the requestor email address (domain identifier 410). Furthermore, in some embodiments a requestor interacting with the email service can select a mapped domain 420 from a list of available domains being managed by the email service. In this way, the recipient can interact with his/her email client and the email service to manually identify another domain 420 that is to be mapped to the domain identifier 402 of the temporary email address data structure 400.

The temporary identifier 401 is temporary linked, mapped, or associated with the original identifier of the requestor email address 410. This mapping is maintained by the email service that processes messages for the requestor to the requestor's email client. Thus, when the email service receives a message directed to the temporary identifier 401, it checks to see if there is an active association and mapping to the original identifier 411, and if there is the email service forwards the received message to the email client of the requestor. If there is not a valid mapping, then the email service bounces the message back to the original sender. There will not be a valid mapping when the temporary email address data structure 400 has expired.

The temporary email address data structure 400 includes a first portion that is the temporary identifier 401 and a second portion that is the domain identifier 402. The first portion 401 is randomly or deterministically generated and maps to a requestor's email address 410 (specifically a first portion or an original identifier 411 of that email address 410). The second portion 402 is the same as the domain identifier 412 used in the requestor's email address 410. Alternatively, the second portion 402 is mapped to other domains 420 managed and within the control of the email service that creates and manages the temporary email address data structure 400.

The temporary email address data structure 400 is known to the email service and the email client. Thus, when a message is directed to an email address represented as the temporary email address data structure 400, the email service strips the value assigned as the temporary identifier 401 (first portion) and maps that to the original identifier 411 of the requestor email 410. The message is then sent to the requestor's email client using the requestor email address 410.

The email client manages and presents the messages which are directed to the temporary identifier 401. In this way, the requestor can visually discern these messages and manage them in manners that he/she desires. Furthermore, expiring rules can be communicated from the email client and to the email service. These expiring rules define the circumstances under which the email service is to terminate and stop accepting the temporary email address data structure 400 with received messages.

In a similar manner the temporary email address data structure 400 can be used by the requestor to send messages to recipients. Thus, the temporary email address data structure 400 is not only used to receive messages, but can also be used to send messages. This is particularly useful when the requestor needs to reply to a received message associated with the temporary email address data structure 400. The recipient of a message generated by the requestor will see only the temporary email address 401 and 402 and will not see the mappings or the requestor email address 411 and 412.

Although specific embodiments have been illustrated and described herein, one of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for generating a temporary electronic mail address implemented in a computer-readable medium and to process on a computer for performing the method, comprising:

receiving a request for the temporary email address from a requestor having a requestor email address, the request is received from an email client that the requestor uses to send and receive email messages, and the requestor makes the request via interactions with the email client;

generating the temporary email address, wherein generating further includes evaluating rules the requestor defines to produce the temporary email address, the requestor interacts with the email client to also define when the temporary email address is to expire based on a specific calendar date for the temporary email address to expire, and wherein generating further includes mapping a first domain for the temporary email address to a second and different domain based on a selection made by the requestor from a list of available domains;

mapping the temporary email address to the requestor email address; and transmitting the temporary email address to the requestor via the email client of the requestor for the requestor to use to send emails over the Internet using the temporary email address and to receive emails over the Internet directed to the temporary email address and received at the requestor email address, the emails received and directed to the temporary email address having distinguishing features applied to metadata received with those emails that permit an email client for the requestor to present the distinguishing features with those emails within the email client and obtaining by the requestor information from a service with the temporary email address.

2. The method of claim 1 further comprising removing the mapping between the temporary email address and the requestor email address after receiving a removal request from the requestor.

3. A method for managing a temporary electronic mail (email) address implemented in a computer-readable medium and to process on a computer for performing the method, comprising:

requesting, from an email client of a user, the temporary email address for an original email address, the email client is used by the user to send and receive email messages and the user interacts with the email client to request the temporary email address, defining, by the user, rules for generating the temporary email address, and interacting, by the user, with the email client to define when the temporary email address is to expire on a specified date defined by the user, the user can issue an immediate command that immediately expires the temporary email address, and wherein defining further includes identifying a first domain for the temporary email address as a mapping to a second and different domain based on a selection by the user from a list of available domains;

using, on the email client, the temporary email address as if it were the original email address for the user to send and receive emails;

receiving or sending, from the email client and over the Internet, a message associated with the temporary email address, the user using the temporary email address with a service and that service includes a privacy policy with respect to email addresses; and monitoring other received messages directed to the user that uses the temporary email address to ensure the service has not disclosed the temporary email address in violation of the service's privacy policy, received messages having metadata with distinguishing features that are applied to present the received messages with the distinguishing features within an inbox of the email client.

4. The method of claim 3 further comprising interacting with an email service when requesting the temporary email address.

5. The method of claim 3 further comprising creating a separate mailbox folder for receiving the message that is associated with the temporary email address.

6. The method of claim 5 further comprising requesting that the temporary email address expire.

7. A temporary electronic mail (email) system implemented on an email server, comprising:

a temporary email address generator implemented and processing on an email server;

a temporary email address mapper implemented and processing on the email server; and a temporary email address interface implemented and processing on the email server, the temporary email address interface receives a request from a requesting email address to generate a temporary email address, the email address generator produces the temporary email address using rules the user defines and a first domain in the temporary email address maps to a second and different domain based on a selection of the user from a list of available domains, also the request is received from an email client associated with the email address, the email client is used by the user associated with the email address for the user to send and receive email messages and the user makes the request via interactions with the email client, the temporary email address interface interacts with the temporary email address generator for generating the temporary email address based on the rules the user defines, the temporary email address is generated and the temporary email address interface interacts with the temporary email address mapper for establishing an association between the requesting email address and the temporary email address, the user defines expiring rules for when the temporary email address is to expire on a set calendar date, the user can issue an immediate command that immediately expires the temporary email address, the temporary email address is monitored after supplied to the user to ensure that a service having a privacy policy with respect to email addresses does not violate that privacy policy with respect to the user's temporary email address, and the user sends and receives emails over the Internet using the temporary email address.

8. The temporary email address system of claim 7 further comprising a forwarder that receives a message directed to the temporary email address and interacts with the temporary email address mapper to acquire the association to the requesting email address, and wherein the forwarder forwards the message to the requesting email address.

9. The temporary email address system of claim 7 further comprising a temporary email address manager that determines when the temporary email address mapper is contacted for removing the association.

10. The temporary email address system of claim 7, wherein the system is implemented as a service associated with an email provider.

11. The temporary email address system of claim 7, wherein the system is implemented as a service associated with an Internet Service Provider (ISP).

* * * * *